United States Patent [19]

Schmaderer et al.

[11] Patent Number: 5,066,209
[45] Date of Patent: Nov. 19, 1991

[54] VENTED TIRE MOLD

[75] Inventors: Gerhard Schmaderer, Cham; Rainer Hilke, Berg, both of Fed. Rep. of Germany

[73] Assignee: A-Z Formen-und Maschinenbau GmbH, Munich, Fed. Rep. of Germany

[21] Appl. No.: 516,075

[22] Filed: Apr. 27, 1990

[30] Foreign Application Priority Data

May 2, 1989 [DE] Fed. Rep. of Germany ....... 3914649

[51] Int. Cl.$^5$ ............................................. B29C 35/02
[52] U.S. Cl. ................................... 425/28.1; 425/47; 425/812
[58] Field of Search .................. 425/812, 28.1, 47, 54, 425/55, 35

[56] References Cited

U.S. PATENT DOCUMENTS

| | | | |
|---|---|---|---|
| 4,319,872 | 3/1982 | Lupke et al. | 425/812 |
| 4,708,609 | 11/1987 | Yoda et al. | 425/28.1 |
| 4,812,281 | 3/1989 | Beard et al. | 425/28.1 |

*Primary Examiner*—Willard Hoag
*Attorney, Agent, or Firm*—Robert W. Becker

[57] ABSTRACT

A vented tire mold is provided that includes a segment member that has a surface that forms the tread surface of a tire and has integrally formed thereon projecting ribs. These ribs have side surfaces that extend perpendicular or at an angle to the surface of the segment member and serve to form a corresponding profiling in the tread surface of the tire. At least one venting gap having specific dimensions is formed in the segment member and extends along a line of intersection between the surface of the segment member and the side surface of the rib.

15 Claims, 3 Drawing Sheets

VENTED TIRE MOLD

BACKGROUND OF THE INVENTION

The present invention relates to a vented tire mold that includes a surface that forms the tread surface of a tire and is provided on a segment member that has integrally formed thereon projecting ribs to form a corresponding profiling in the tread surface of the tire, with the ribs having side surfaces that extend essentially perpendicular or at an angle to the surface of the segment member. The present invention also relates to a tire having a profiled tread surface.

Tire molds of this type are provided with ribs that are formed on a segment member. These ribs produce a corresponding profiled recess or groove on the tire that is produced with the tire mold. Such a tire mold must permit a venting during the tire-molding process, so that the air that is trapped in the profiling can be withdrawn during the molding process and a uniform tire surface can be produced.

To vent tire molds, it is known to provide an inclined recess on the sides of the ribs of the segment member; air that remains, and always also a portion of the rubber mixture, can enter this inclined recess. When the mold is removed, the resulting rubber plugs are to be unilaterally torn off. Although with this approach separate venting channels can be avoided, the drawback results that the remaining rubber plugs must be removed from the tire via a special trimming machine. A further drawback is that the tire mold must be cleaned after each molding process in order to remove any residue that might remain.

To avoid these drawbacks, it is known to provide the tire mold with venting holes that are interconnected via a venting channel that is connected to a vacuum source. With this type of tire mold, however, a reliable withdrawal of the air is possible only with very simple profilings that have no transverse ribs, or with such profilings where possible trapped air at the transverse ribs can be taken into consideration.

Finally, with tire molds, especially for tires of trucks and large commercial agricultural vehicles, it is known to bolt or otherwise secure the ribs on a tread mold as a separate component and to provide respective venting slits at the bases of the ribs. However, tire molds having riveted or screwed-on ribs are relatively expensive.

It is furthermore known to make each of the individual segment members relatively small, so that the tire mold then comprises a plurality of segments. The venting is then respectively effected at the abutment faces of the segment members, which do not adjoin one another in a completely sealing manner. Unfortunately, this type of venting is inclined to clogging, so that after a relatively short period of use, the entire tire mold must be taken apart and the individual segment bodies must each be cleaned.

It is furthermore known to insert into the tire mold, which can, for example, be made of aluminum, lamellae of a material other than aluminum, such as sheet steel, and to utilize the manufacturing-related slits between the lamellae insert and the mold for the venting. Such lamellae are either provided as profiling lamellae or as true venting lamellae inserts, that are provided, for example, at the base of the ribs, whereby the lamellae inserts should then end flush with the tread surface. In order to provide cross-sectional slit areas that are adequate for the venting, either a number of venting lamellae must be provided, which means a considerable additional expense, or an attempt must be made to produce an adequate slit width.

However, because of the slits that extend over their entire length, the lamellae inserts tend to loosen, so that it has also become known to produce a positive connection during casting of the mold via openings formed in the lamellae.

One aspect that negates use of the known lamellae insert ventings is the fact that although the width of the slits can be kept small, so that generally no or very little rubber can enter the venting slits, if this is the case small kernels that still result at these locations tend during repeated use of the mold to increase in size and hence to eventually cause a blockage; the removal of the residual rubber that is found there is then very difficult due to the good adhesion in the slit.

This positive connection obstructs the venting somewhat and above all forms a blockage that for all practical purposes cannot be cleaned if rubber mixture gets into the slit. For this reason, the conversion has again been made to provide venting holes at the critical locations, i.e. those locations where the longitudinal and transverse ribs come together at an acute angle, in which connection the formation of rubber plugs is taken into account, whereby these rubber plugs then have to be removed with an appropriate trimming machine.

It is therefore an object of the present invention to provide a vented tire mold and tire of the aforementioned general types that, with respect to the venting, enable a long, problem-free operation and a relatively easy cleaning without the necessity for having to dress the tire surface, and without the visual impression that the finished tire makes having to suffer.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
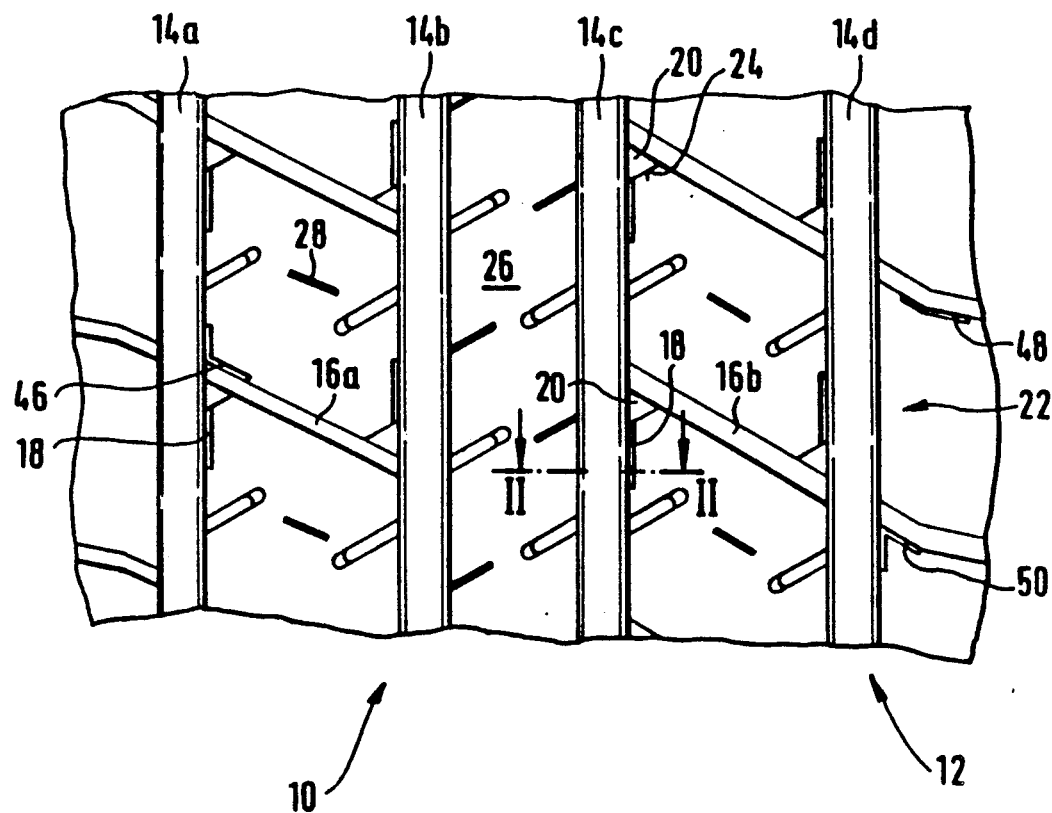
FIG. 1 shows a portion of one exemplary embodiment of the inventive tire mold to illustrate the inventive venting gaps.

The vented tire mold of the present invention is characterized primarily in that at least one venting gap having specific dimensions is formed in the segment member and extends along a line of intersection between one of the side surfaces of the ribs and the surface of the segment member.

The use of the inventive venting gaps directly at the bases of the ribs above all ensures that residual rubber that theoretically could result there would result at a profiling edge and consequently would be nearly impossible to discover and in particular would not adversely affect the visual impression of the tire. Consequently, grinding grooves that result from the use of a trimming device can already in principle be prevented.

Even beyond that, by forming the venting gap in the segment member the surprising advantage results that despite more favorable manufacturing costs a completely satisfactory venting is possible that is not susceptible to clogging and also does not tend to produce clogging seeds. Due to the specific dimensions of the inventive venting gaps, even with the desired very small dimensions that are intended to prevent the entry of the rubber mixture, the venting gaps have a shape that enable the free passage of the air.

The specific dimensions make it possible, for example, for the cross-sectional area of the venting gap to increase in a direction toward the outer side of the mold. As a result, if a cleaning is then to be undertaken, the advantage is provided that the venting gap can easily be blown out from the outside, whereby any residual rubber that exists can be driven out as plugs without any residue remaining.

Although it is also possible to clean venting gaps that extend through the entire segment body with a uniform cross-sectional area via appropriate nozzles by the action of compressed air, it is particularly advantageous to have the venting gap open out into a round venting hole, the cross-sectional area of which is greater than the cross-sectional area of the venting gap, since in so doing it is possible to use conventional nozzles as a source of compressed air. In this connection, it is to be understood that the venting holes can be provided with a chamfer in order to facilitate connection of the nozzle.

Due to the inventive venting gaps that extend along the line of intersection between the side surfaces of the ribs and the surfaces that form the tread surface of the tire, the formation of unevenness on the tread surface itself is additionally prevented; up to now with the use of true venting lamellae inserts this unevenness was unavoidable, since slits were provided on both sides of the venting lamellae, and in addition the end face of the venting lamellae itself formed a certain unevenness for the tread surface of the tire.

Pursuant to the present invention, it is furthermore particularly advantageous that the drawbacks of the state of the art can be avoided. It is possible to use a gap width that conforms to the respective requirements, in other words to the viscosity of the utilized rubber mixture that results during the molding, in which connection it is advantageous to work with a gap width of considerably less than 1 mm, yet greater than 0.1 mm. With straightforward profilings and small tire diameters, a gap width of 0.05 mm would also be suitable.

It is expedient to utilize a venting gap having an elongated, rectangular cross-sectional configuration, with the constant width over the length of the gap on the one hand preventing rubber mixture from entering, and on other hand providing a venting opening of uniform size.

It is furthermore advantageous if the gap with the specific dimensions laterally directly adjoins the side surface of the rib, while the surface that corresponds to the tread surface of the tire extends completely smoothly from the opposite end face of the gap to the next rib or lamellae, which can similarly be provided with an appropriate venting gap.

Pursuant to one advantageous specific embodiment of the present invention, the venting gap can in principle be rectangular, yet have rounded corners. In extreme cases, the gap can terminate in semicircular ends, which can be advantageous for reducing clogging.

Pursuant to a further advantageous specific embodiment, the rib can be laterally provided with an insert that is disposed in the wall surface of the rib and hence does not visually alter the tread surface of the tire. This insert can follow the side surface of the rib toward the outside of the mold and thus form a lateral delimiting surface for the gap.

As used hereinafter, "integrally formed thereon" means that parts to which the expression refers are portions of a unitary, one-piece whole.

Pursuant to a further advantageous specific feature of the present invention, the width of the venting gap can be tapered in the direction toward the tire surface, so that toward the outer side of the mold the venting gap widens and expediently opens out into a circular venting hole. It has been shown that the tapered configuration of the venting gap prevents or at least makes it more difficult for the rubber mixture to enter, even if a relatively large gap width is utilized. The mold can be cleaned very easily by being blown out, whereby the desired plug action is utilized where the resulting residual rubber can be blown out as a whole. Thus, any contamination that is present can be removed by being blown out without any mechanical cleaning subsequently being required.

Pursuant to a further advantageous specific embodiment of the present invention, the ridge provided at the edge between the gap and the surface of the tire mold that forms the tread surface does not lead to any kind of visible recess in the tire surface, but rather acts for all practical purposes like a slight chamfering of the edge between the base of the profiling and the tread surface. This chamfering is advantageous, because on the one hand any residual rubber that might possibly remain is brought to a deeper level relative to the tread surface, so that it does not project, and on the other hand a certain rounding effect of the edge is achieved. In addition, this ridge in practice forms a barrier to keep the inner surfaces of the gap from being coated.

Further specific features of the present invention will be described in detail subsequently.

Description of Preferred Embodiments

Referring now to the drawings in detail, FIG. 1 illustrates part of a segment member 12 of a tire mold 10. Disposed on the inner periphery of the segment member 12 are longitudinal ribs 14a to 14d, between which extend transverse ribs 16a and 16b. The illustrated profiling of the tire mold 10 as formed by the longitudinal ribs 14a to 14d and the transverse ribs 16a and 16b is by way of example only, so that it is readily possible to provide any other desired profiling with the inventive venting gaps 18, a plurality of which are shown in FIG. 1.

As can be seen, the venting gaps 18 extend predominantly along the longitudinal ribs 14a to 14d and the transverse ribs 16a and 16b, and in particular are disposed in the vicinity of profiling angles or corners 20 where a respective longitudinal rib, for example 14c, and a transverse rib, for example 16b, come together at an acute angle. In the illustrated configuration or profiling 22, the profiling angle 20 is provided with an inclined surface 24 that is intended to prevent the pertaining profiling angles of the finished molded tire from breaking. The venting gap 18 extends from directly adjacent the inclined surface 24, so that that location that is the most susceptible to the formation of air pockets or bubbles is vented.

On the whole, the venting gaps 18 extend over only a portion of the edges that are formed between the ribs and a surface 26 that corresponds to the tread surface of the tire. However, the position of the venting gaps 18 can expediently be selected in any desired manner and are adapted to the respectively existing requirements.

The embodiment of the segment member 12 illustrated in FIG. 1 is furthermore provided with lamellae 28 that can similarly be provided with venting gaps 18 that are formed in the cast aluminum of the segment member 12.

Figure 2:
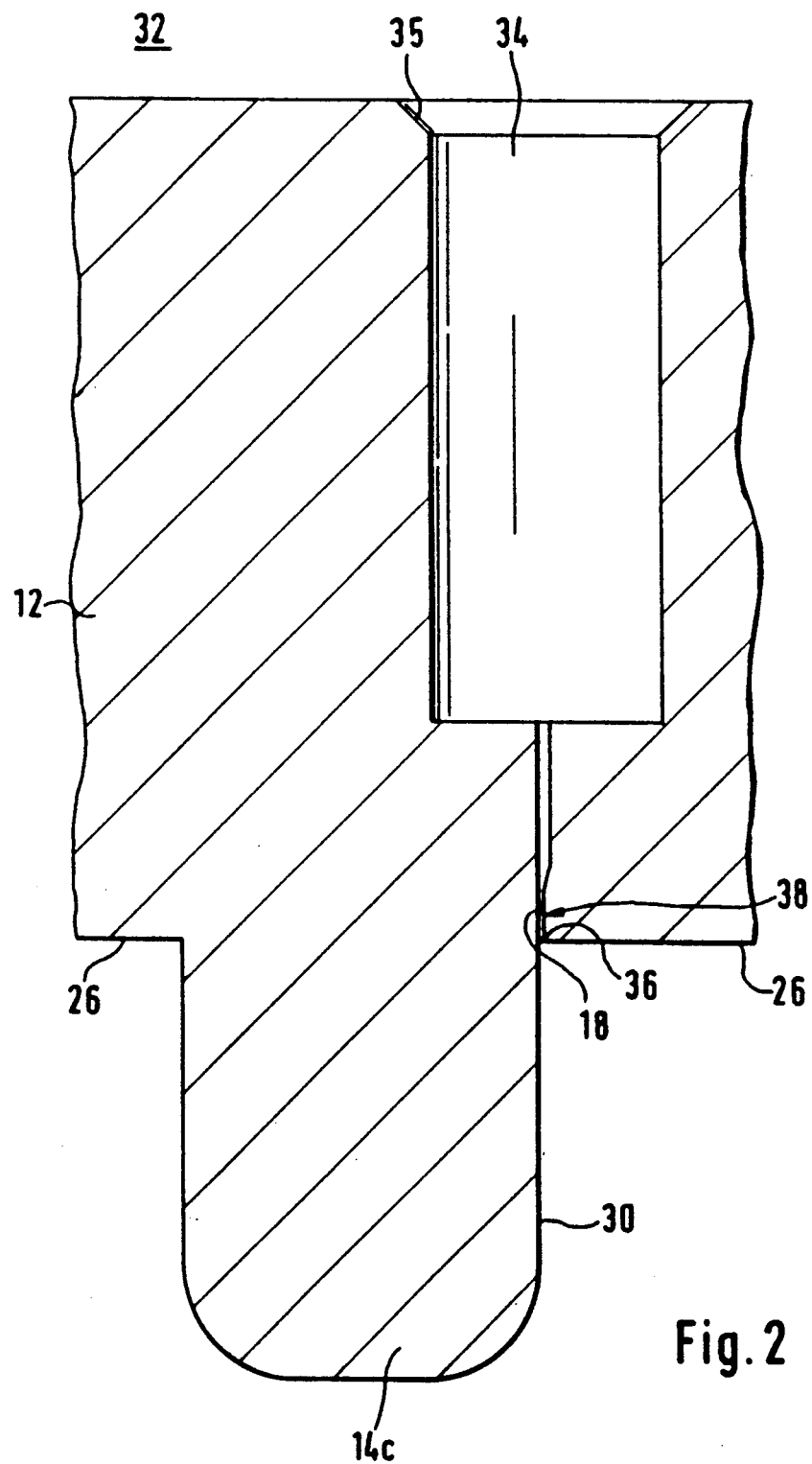
FIG. 2 is a cross-sectional view taken along the line II—II in FIG. 1 of one exemplary embodiment of a venting gap provided on a rib.

The cross-sectional view of FIG. 2 illustrates the configuration of an inventive venting gap 18. The venting gap 18 extends outwardly along an extension of the side surface 30 of the rib 14c, i.e. to an outer surface 32 of the segment member 12. Adjoining the venting gap 18 is a venting hole 34, the radius of which considerably exceeds the width of the venting gap 18, with the cross-sectional area of the venting hole 34 similarly being greater than the cross-sectional area of the venting gap 18.

The outside of the venting hole 34 is provided with a chamfer 36.

As can be seen from FIG. 2, the venting gap 18 is tapered in a direction toward the surface 26, and is provided with a narrow zone 38 immediately adjacent to an edge 36 that is formed between the venting gap 18 and the surface 26. The narrow zone 38 has an essentially constant width along the longitudinal rib 14c, and forms an obstruction against the entry of rubber mixture.

In all of the figures, the same or similar reference numerals refer to the same or similar parts, and require no further explanation.

As can also be seen from FIG. 2, with the exception of the micro roughness of the inner surface of the segment member 12, that region of the surface 26 that adjoins the edge 36 is completely flat. This translates into a correspondingly flat tread surface portion of the completed tire, without small venting plugs or the like being visible on the tire.

Figure 3:
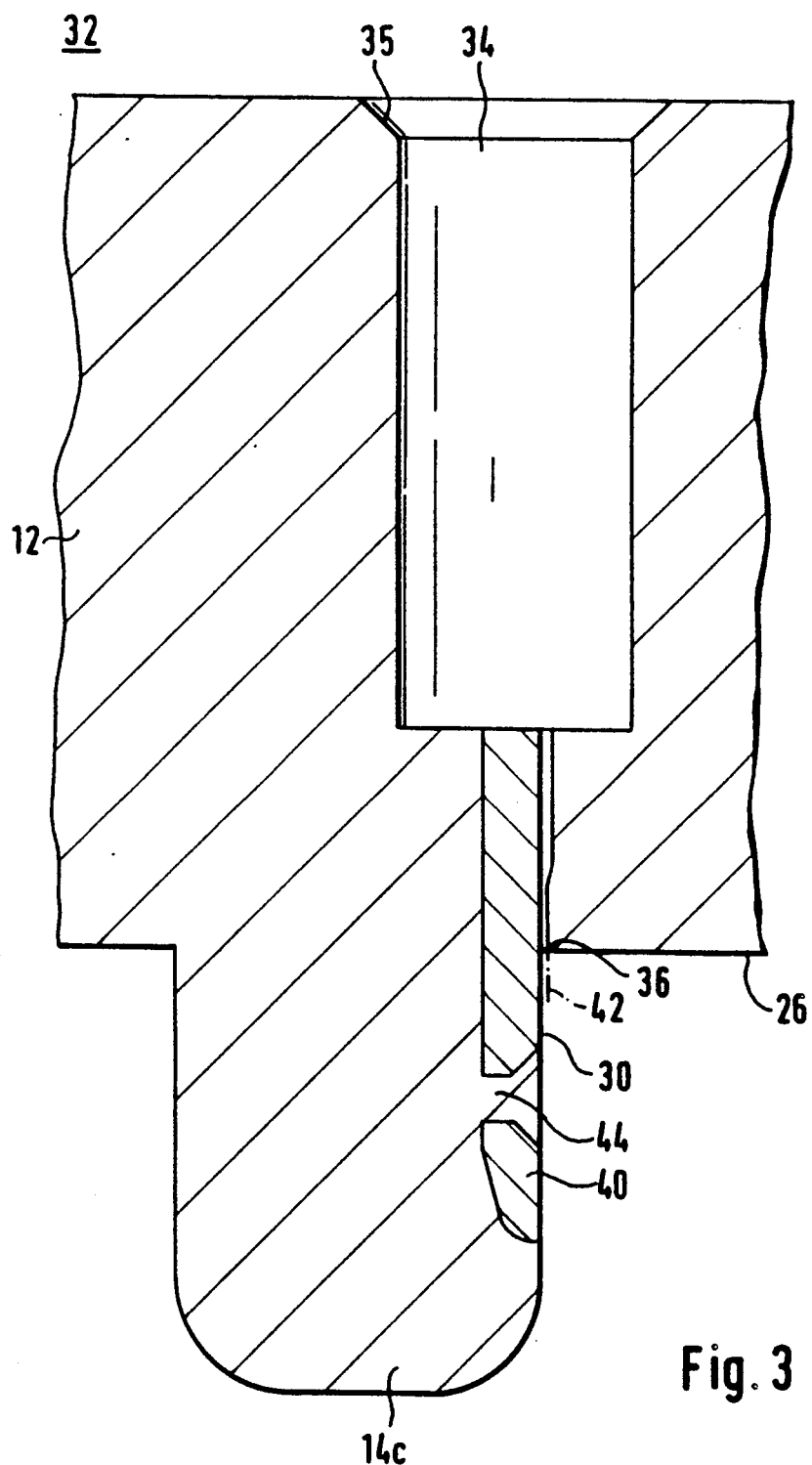
FIG. 3 is a cross-sectional view similar to that of FIG. 2 of a further exemplary embodiment of an inventive venting gap.

In the further embodiment illustrated in FIG. 3, a metal strip 40 that is made of a material that is harder than the material of the segment member 12 is cast in and thus forms the side surface 30 of the rib 14c at that side thereof that adjoins the venting gap 18. With such a measure, the desired gap width can be made to an even more exact tolerance.

It is furthermore also advantageous for the surface of the metal strip 40 to be kept fairly smooth, so that the rubber mixture that is utilized for the tire does not tend to adhere to that location.

It should be understood that the present invention is not restricted to providing venting gaps 18 only at the longitudinal ribs 14a to 14d. Rather, it is also readily possible to form an appropriate venting gap 18 at any other desired location in the segment member 12 in order to ensure the desired venting.

By disposing the venting gaps 18 along a line of intersection 42 between the surface 26 and the side surface 30 of the longitudinal rib 14c, the visibility of venting plugs is significantly reduced or even precluded, whereby due to the prescribed dimensioning of the gap, entry of rubber mixture into the venting gap 18 is at least reduced, and possibly is completely prevented.

As can be seen from FIG. 3, the metal strip 40 is provided with an opening 44 that is integrally filled with the aluminum of the segment member. By means of this opening 44, the metal strip 40 is fixed at the desired location without this securement measure adversely affecting venting via the venting gap 18. It is to be understood that a plurality of similar openings could be provided along the metal strip 40.

It is furthermore possible to use not only linear venting gaps but also curved venting gaps; for example, reference is made to the venting gap 46 illustrated in FIG. 1. In this connection, the design of the venting gap 46 is particularly advantageous since during molding of the tire, the air readily collects on the inner sides of the longitudinal ribs 14a or 14d. The reason for this is that during the molding process, the rubber mixture first comes into engagement with the mold in the region of the inner longitudinal ribs 14b and 14c. By means of venting gaps such as the venting gap 46, but also via the venting gaps 48 or 50 along the outer transverse ribs, the likelihood that additional air pockets can occur is considerably reduced. The important thing is that the inventive venting gaps can be provided at any desired location on the ribs.

A further distinct advantage over the previous state of the art, where holes were provided in the corners, is derived from the fact that the inventive venting gap can be disposed exactly in the edge between rib and tread surface; it was previously practically impossible to produce holes of, for example, 0.6 mm diameter. Rather, holes were formed with larger diameters, in which then small steel rollers in the form of plugs were inserted that had, for example, an inner diameter of 0.6 mm. As a result of this construction, the plug opening could not be disposed exactly in the corner region, so that the venting was not optimum.

It is furthermore particularly advantageous that the inventive venting gaps can be provided not only on individual segments, on sector-shaped segment members, and also on complete rings. Although the preferred embodiment is a relatively narrow venting gap in the region of the tread surface 26, with the gap having a larger cross-sectional area toward the outside, i.e. in the direction toward the venting hole 34, it is also readily possible to have a linear venting gap 18, so that its width does not vary.

The present invention is, of course, in no way restricted to the specific disclosure of the specification and drawings, but also encompasses any modifications within the scope of the appended claims.

What we claim is:

1. In a vented tire mold that includes a surface that forms the tread surface of a tire and is provided on a segment member and has integrally formed thereon projecting ribs to form a corresponding profiling in said tread surface of said tire, whereby said ribs have side surfaces that extend essentially perpendicular or at an angle to said surface of said segment member, the improvement wherein:

at least one venting gap having specific dimensions is formed in said segment member and extends in its longitudinal direction along a line of intersection between one of said side surfaces of said ribs and said surface of said segment member and has a dimension of depth in a radially outward direction of said mold.

2. A vented tire mold according to claim 1, in which said venting gap, at an end thereof adjacent to said side surface and said surface of said segment member, has a width of at least 0.1 mm.

3. A vented tire mold according to claim 1, in which said venting gap, at an end thereof adjacent to said side surface and said surface of said segment member, has a width that is significantly less than 1 mm.

4. A vented tire mold according to claim 1, in which, remote from said surface of said segment member, said venting gap opens into a venting hole, the cross-sectional area of which is greater than the average cross-sectional area of said gap and is considerably greater than the cross-sectional area of the narrowest zone of said gap.

5. A vented tire mold according to claim 1, in which a ridge is provided at an edge of said venting gap that adjoins said surface of said segment member.

6. A vented tire mold according to claim 1, in which each of said venting gaps opens out immediately adjacent a base of a rib, with said gap having an axis that essentially coincides with an imaginary extension of said side surface of that rib.

7. A vented tire mold according to claim 1, in which a width of said venting gap is tapered in the direction toward said tread surface of said tire and has a narrow zone adjacent to an edge of said venting gap that adjoins said surface of said segment member.

8. A vented tire mold according to claim 1, in which said rib is provided with a metal plate that extends beyond said venting gap in a radially inward direction of said tire mold, with the surface of said plate forming said side surface of said rib.

9. A vented tire mold according to claim 8, in which said metal plate has an opening that is open to the body of said rib and is spaced from said venting gap.

10. A vented tire mold according to claim 1, in which said ribs include longitudinal and transverse ribs that are arranged in a longitudinal and transverse direction relative to a circumferential direction of said tire, with said longitudinal ribs extending between said transverse ribs.

11. A vented tire mold according to claim 10, in which a portion of said venting gap extends along said line of intersection at any desired location of said longitudinal rib in the circumferential direction of said tire.

12. A vented tire mold according to claim 10, in which a portion of said venting gap extends along said line of intersection at essentially 90° to the circumferential direction of said tire.

13. A vented tire mold according to claim 10, in which a portion of said venting gap is disposed adjacent a location where one of said longitudinal ribs and one of said transverse ribs come together at an acute angle.

14. A vented tire mold according to claim 10, in which said venting gap is disposed at any desired location on said surface of said segment member along said line of intersection.

15. A vented tire mold according to claim 14, in which said venting gap extends along said longitudinal rib.

* * * * *